(12) United States Patent
Hoffmann

(10) Patent No.: US 8,247,365 B2
(45) Date of Patent: Aug. 21, 2012

(54) DETOXICANT SOLUTION

(75) Inventor: Klaus Hoffmann, Bad Kreuznach (DE)

(73) Assignee: OWR AG, Elztal-Rittersbach (DE)

( * ) Notice: Subject to any disclaimer, the term of this patent is extended or adjusted under 35 U.S.C. 154(b) by 1505 days.

(21) Appl. No.: 11/717,323

(22) Filed: Mar. 13, 2007

(65) Prior Publication Data

US 2012/0121460 A1 May 17, 2012

Related U.S. Application Data

(63) Continuation of application No. PCT/EP2005/009445, filed on Sep. 2, 2005.

(51) Int. Cl.
*C11D 17/08* (2006.01)

(52) U.S. Cl. .......... 510/405; 510/407; 510/508; 588/15; 588/407

(58) Field of Classification Search ............ 510/405, 510/407, 508; 588/15, 407
See application file for complete search history.

(56) References Cited

U.S. PATENT DOCUMENTS

| | | | |
|---|---|---|---|
| 3,634,278 A | 1/1972 | Wolverton | |
| 3,714,349 A | 1/1973 | Wolverton | |
| 5,336,329 A | 8/1994 | Langenmayr | |
| 5,736,032 A | 4/1998 | Cox et al. | |
| 6,517,906 B1 * | 2/2003 | Economy et al. | 427/392 |
| 2003/0096720 A1 * | 5/2003 | Huth et al. | 510/161 |

FOREIGN PATENT DOCUMENTS

| | | |
|---|---|---|
| DE | 301 726 A9 | 8/1993 |
| DE | 43 01 639 A1 | 8/1994 |
| DE | 44 20 360 A1 | 12/1995 |
| EP | 0 443 739 A1 | 8/1991 |

OTHER PUBLICATIONS

Wolthers et al, DD 301 726 A9, 1993, Google Machine Translation.*

* cited by examiner

*Primary Examiner* — James D Anderson
*Assistant Examiner* — Ibrahim D Bori
(74) *Attorney, Agent, or Firm* — Laurence A. Greenberg; Werner H. Stemer; Ralph E. Locher

(57) ABSTRACT

A detoxicant solution includes 0.1 to 50 parts by weight of at least one Friedel-Crafts reagent (Lewis acids) (I); 0.5 to 80 parts by weight of one or more of the following specific solvents (II): dimethyl sulfoxide, 1,3-dimethyl-2-imidazolidinone or octamethylcyclotetrasiloxane; and 1 to 80 parts by weight of an alcoholic solvent (III). The term "parts by weight" relates in each case to 100 parts by weight of the complete detoxicant solution.

11 Claims, No Drawings

DETOXICANT SOLUTION

CROSS-REFERENCE TO RELATED APPLICATION

This is a continuation, under 35 U.S.C. §120, of copending international application PCT/EP2005/009445, filed Sep. 2, 2005, which designated the United States; this application also claims the priority, under 35 U.S.C. §119, of German patent application DE 10 2004 044 621.0, filed Sep. 13, 2004; the prior applications are herewith incorporated by reference in their entirety.

BACKGROUND OF THE INVENTION

Field of the Invention

The present invention relates to a detoxicant solution for detoxifying contaminated surfaces.

The present invention further relates to a method for preparing the detoxicant solution of the invention, a method for detoxifying surfaces contaminated with chemical and/or biological warfare agents, and the use of the detoxicant solution of the invention for decontaminating surfaces contaminated with chemical and/or biological warfare agents.

Chemical and biological warfare agents are still included in the weapons arsenal of numerous countries. It is moreover perfectly conceivable that terrorist groups will make use of such weapons which, on the one hand, may have catastrophic effects, especially for the civilian population, because of their extremely high toxicity and, on the other hand, are less difficult to obtain by comparison with nuclear weapons.

It is known that chemical warfare agents may cause extensive damage to the central nervous system inter alia and thus may lead to serious injuries and frequently even to death. The most dangerous chemical warfare agents include in this connection in particular organophosphorus compounds such as, for example, tabun, soman, sarin and VX, and the warfare agent mustard gas which causes blisters on the skin.

Besides these chemical warfare agents, also referred to as chemical weapons, there exist numerous highly toxic biological weapons, including various toxins based on proteins, and bacteria or viruses, which may cause inter alia food poisonings, damage to the central nervous system, inflammations, anthrax, pneumonic plague, Ebola or smallpox.

The described chemical warfare agents are normally mixed, before they are actually applied, with so-called thickeners in order to improve their adhesion capacity and impede their detoxification. Such thickeners are in this connection also referred to as adhesive agents which retain their tackiness for a very long time and considerably increase the effectiveness of the warfare agents combined with them through their good adhesion to surfaces, clothing and the human skin.

Attempts have been made since the first use of chemical and biological warfare agents to render these substances harmless by detoxicants. In this context it should be self-evident and understood that the substances used for detoxication should be as non-hazardous as possible for humans and the environment. Although the strongly oxidizing or hydrolyzing substances formerly used show a good effect in their ability to destroy chemical warfare agents, they have the disadvantage that they are frequently themselves toxic for humans. In addition, they are in most cases highly corrosive for metal surfaces contaminated with warfare agents.

Further detoxifying substances are based inter alia on a solution of 70% strength diethylenetriamine, 28% methylcellosolve and 2% sodium hydroxide. Such solutions are not corrosive for most metals, but they are toxic for humans.

U.S. Pat. No. 3,714,349 describes a non-toxic and non-corrosive detoxifying solution which is effective on the basis of 50 to 70% by volume monoethanolamine, 30 to 50% by volume glycol, 5 to 10% by volume of a non-toxic chlorine compound, in particular chloramine T, and 0.5 to 1.0% by weight, based on the total of the other components, of histidine. However, a disadvantage of the solution described therein is that it is unable to dissolve the thickeners normally mixed with the actual warfare agents, so that the warfare agents are effectively protected by the thickeners enveloping them from rapid detoxification.

U.S. Pat. No. 3,634,278 relates to a decontaminating agent for chemical and biological warfare agents which comprises, as essential components, a binary mixture of monoethanolamine and solvents such as hexylene glycol, monoisopropanolamine, propylene glycol monomethyl ether or dipropylene glycol monomethyl ether and is reacted with lithium compound. The lithium monoethanolamine resulting therefrom serves to detoxify warfare agents. However, the described detoxicant solution likewise has the disadvantage that it is unable to eliminate the protective effect of thickeners, so that the detoxicant can—if at all—act on the warfare agents only in a very retarded fashion.

SUMMARY OF THE INVENTION

The present invention is therefore based on the object of remedying the described disadvantages and providing a detoxicant solution which is highly effective for customary chemical warfare agents, in particular reacts very rapidly, and is able to dissolve the thickeners which are frequently mixed with the warfare agents.

The present invention extends further to a method for preparing the detoxicant solution of the invention, to a further method for use of the detoxicant solution of the invention, and to the use of the detoxicant solution of the invention for decontaminating contaminated surfaces.

With the foregoing and other objects in view there is presented, in accordance with the invention, an improved detoxicant solution which comprises, in parts by weight:
0.1 to 50 parts of at least one Friedel-Crafts reagent (Lewis acids) (I);
0.5 to 80 parts of one or more of the following specific solvents (II): dimethyl sulfoxide, 1,3-dimethyl-2-imidazolidinone or octamethylcyclotetra-siloxane; and
1 to 80 parts of an alcoholic solvent (III).

The term "parts by weight" as used here relates in each case to 100 parts by weight of the complete detoxicant solution.

In other words, I have found a novel detoxicant solution which is effective on the basis of the above substances.

The detoxicant solution of the invention comprises as active component from 0.1 to 50 parts by weight, in particular 1 to 40 parts by weight and particularly preferably 2 to 35 parts by weight of one or more Friedel-Crafts reagents (I). Suitable Friedel-Crafts reagents are inter alia boron trifluoride, boron trichloride, aluminum trichloride, iron trichloride, iron tribromide and titanium tetrachloride, with boron trifluoride and aluminum trichloride having proved to be particularly effective Friedel-Crafts reagents. These reagents are also referred to as so-called Lewis acids. They are commercially available substances which are employed on a large scale in the chemical industry.

The detoxicant solution of the invention further includes 0.5 to 80 parts by weight, in particular 5 to 75 parts by weight and particularly preferably 10 to 70 parts by weight of one or more of the specific solvents (II).

Of these specific solvents, 1,3-dimethyl-2-imidazolidinone is particularly suitable for acting on the thickeners or adhesive agents mixed with the warfare agents. Solvents of the type of (II) can be purchased commercially.

The very good effectiveness of the detoxicant solution of the invention is based inter alia on the excellent dissolving capacity of dimethyl sulfoxide, 1,3-dimethyl-2-imidazolidinone and octamethylcyclotetrasiloxane for such thickeners which are normally mixed in an amount of from 1 to 20% by weight in particular in an amount of from 1 to 10% by weight, with the warfare agents. Such thickeners are usually copolymers based on acrylic acid, methacrylic acid, and esters or anhydrides thereof, on styrene, butadiene or vinyl acetate with minor amounts of other comonomers. They are also marketed in the form of so-called polymer dispersions.

Frequently used thickeners are, inter alia, copolymers of styrene and n-butyl acrylate, polymers based on ethenylbenzene, and copolymers of acrylic acid, which are marketed for example under the name Acronal® by BASF Aktiengesellschaft.

Thickeners also conceivable in addition are based on copolymers of acrylic acid and of vinyl acetate. Such thickeners are usually insoluble in water so that chemical and biological warfare agents thickened therewith cannot be destroyed with water-based detoxicants. Because the detoxicant solutions of the invention are free of water, and the specific solvents (II) have very good dissolving properties, the solutions are capable of effective abolition of the protective effect of such thickeners for warfare materials, so that the active detoxifying components can act on the warfare agent unimpeded.

In addition, the detoxicant solution of the invention also comprises 0.1 to 80 parts by weight, in particular 5 to 75 parts by weight and particularly preferably 10 to 70 parts by weight of an alcoholic solvent (III). Suitable alcoholic solvents (III) are in particular aliphatic alcohols such as methanol, ethanol, 1-propanol, 2-propanol, 1-butanol, 2-butanol, tert-butanol, the various alcohols (1-, 2-, tert-, sec-) of pentanol, of hexanol, of heptanol, and of octanol, of nonanol and of decanol. Further alcohols suitable for this purpose are those derived from aromatic compounds, such as benzyl alcohol and alcohols which also have heteroatoms in the molecule, for example thiodiethanol or diethyl sulfide. Particularly suitable alcoholic solvents (III) are inter alia 2-propanol, 1-heptanol, benzyl alcohol and thiodiethanol. The alcohols (III) described herein can be purchased commercially.

The parts by weight indicated for components (I), (II) and (III) of the detoxicant solution of the invention are based in each case on 100 parts by weight of the complete detoxicant solution.

In order to avoid a corrosive effect of the detoxicant solution of the invention, it may be advisable to use, in addition to the components (I), (II) and (III), also 0.1 to 5 parts by weight, in particular 0.2 to 3 parts by weight and particularly preferably 0.5 to 2 parts by weight, in each case based on 100 parts by weight of the complete detoxicant solution, of 1H-benzotriazole as inhibitor. This substance is available in the specialist trade.

It is additionally possible to add to the detoxicant solution of the invention also 0.25 to 25 parts by weight, in particular also 0.5 to 20 parts by weight and particularly preferably 1 to 20 parts by weight, in each case based on 100 parts by weight of the finished detoxicant solution, of a saturated alicyclic hydrocarbon having 10 to 16 carbon atoms to form a covering layer. In this case, such an alicyclic hydrocarbon forms, after the detoxicant solution has been applied to a surface contaminated with chemical or biological warfare agents, a covering layer which covers the underlying toxic substances and thus prevents them vaporizing before the active decontaminating component (I) decomposes the toxic substances. Depending on the outside temperature present, the covering layers which are formed automatically vaporize after some time and then leave behind a detoxified surface.

Suitable for forming a covering layer are in particular saturated alicyclic hydrocarbons having 10 to 16 carbon atoms, preferably having 11 to 15 carbon atoms. Cyclododecane with the general molecular formula $C_{12}H_{24}$ is particularly suitable for forming a covering layer. Alicyclic hydrocarbons of this type can be purchased through the chemical trade. They are readily soluble in nonpolar solvents and insoluble in polar solvents. The dense film produced through the formation of such a covering layer after application of the detoxicant solution to the contaminated surface is water-impermeable and thus forms very effective protection against the vaporization of the toxic substances.

The detoxicant solution of the invention is particularly suitable for eliminating the nerve gases employed as chemical warfare agents such as, inter alia, ethyl N,N-dimethylphosphoramidocyanide (tabun; designation: GA), isopropyl methyl phosphorofluoridate (sarin; designation: GB), pinacolyl methyl phosphorofluoridate (soman; designation: GD) and O-ethyl-S-(2-(diisopropylamino)ethyl)methylthiothiophosphonate (V agent, designation: VX). In addition, the detoxicant solution of the invention is effective inter alia for a warfare agent which causes blisters on the skin such as dichlorodiethyl sulfide (S mustard or mustard gas; designation: HD), and for N mustard, phosgene, dimethyl dichlorovinyl phosphate or for tetraethyl pyrophosphate. The designation of warfare agents mixed with thickeners includes the prefix T ("thickening"), for example THD.

The great effectiveness of the warfare agents based on organic phosphorus compounds described herein derives inter alia from their capability of effective blocking or destruction of the enzyme cholinesterase in the human body. Cholinesterase is an essential substance in the conduction of impulses in the nervous system.

A substantial advantage of the detoxicant solution of the invention is to be regarded inter alia as the fact that it need not be washed off after the usual action time; on the contrary it automatically vaporizes, if necessary with the assistance of an air blower.

An important feature of the detoxicant solutions of the invention is that the Friedel-Crafts reagents (I) which are present serve as catalysts of a reaction wherein ultimately the halogen atoms present in the molecules of the warfare agents are eliminated from the molecule. In this case, a connection is formed between the highly electrophilic Friedel-Crafts reagents and a halogen atom present in the warfare agent molecule, and elimination thereof from this molecule as a result of breaking a bond between the halogen atom and the adjacent carbon atom.

In addition, the substances used as specific solvents (II) are also capable of effective action as active nucleophilic components on the sulfur and phosphorus groups which are likewise present in the warfare agents.

Thus, for example, dimethyl sulfoxide when used as solvent (II) reacts in its polarized form in a so-called $S_N2$ reaction (nucleophilic substitution) with the chlorine in dichlorodiethyl sulfide (S mustard) with elimination of a chloride, thus destroying the molecular structure of the dichlorodiethyl sulfide.

Dimethyl sulfoxide itself is a nucleophilic aprotic solvent which is also a good solvent for polymers and therefore is particularly suitable for detoxifying thickened warfare agents.

1,3-Dimethyl-2-imidazolidinone, which is likewise very suitable as specific solvent (II) is likewise a very reactive solvent which acts as aprotic polar solvent in nucleophilic substitution reactions.

The same nucleophilic power is also possessed by the sulfur in the thiodiethanol which is likewise used as component (III) of the detoxicant solution of the invention and has the molecular formula: HO—CH2-CH2-S—CH2-CH2-OH.

The detoxicant solutions of the invention are also suitable for destroying biological warfare agents which may likewise have lethal effects for humans even in very small amounts. The biological warfare agents include essentially bacteria, viruses and toxins. Examples thereof are inter alia ricin, the highly toxic protein from ricinus seeds, botulism toxin which occurs in cases of food poisoning, enterotoxins which act on digestive organs and the nervous system, melioidosis pathogens (Pseudom. pseudomallei), Q fever (widespread in domestic animals around the world), Malta fever (brucellosis caused by brucella of animals), tularemia (typhoid-like feverish disease), anthrax (which is transmitted from animals to humans), pneumonia (pneumonic plague, caused by Yersinia pestis), poxviruses, Ebola viruses, and encephalitis (a disease of the central nervous system).

The detoxicant solutions of the invention are moreover capable of effective denaturization, and thus decomposition, of polypeptides and proteins of the viruses and bacteria.

This also applies to the structure of toxins and nucleic acid sequences which likewise have chemical groups on which the detoxicant solutions of the invention can act. In these cases, the so-called toxophoric group is decomposed, thus eliminating its toxic effect. This may take place inter alia by a hydrolytic cleavage of an ester linkage, by cleavage of an amide group, or by attack on an SH group in these molecules. A particular advantage of the detoxicant solutions of the invention is also that they are free of water and comprise alcohols, resulting in biological pathogens of the types mentioned being unable to exist therein and thus being rapidly killed.

The method, which is likewise according to the invention, for preparing the detoxicant solutions is wherein the Friedel-Crafts reagent(s) Lewis acids (I) are mixed together with the specific solvents (II) and the alcoholic solvents (III) and, where appropriate, with 1H-benzotriazole and, where appropriate, the saturated alicyclic hydrocarbon at temperatures from 10° C. to 60° C., in particular at temperatures from 30° C. to 60° C. and preferably from 40° C. to 50° C. It may be advisable in this connection to use suitable mixing apparatuses such as, for example, stirrers, reflux condensers etc.

The detoxicant solutions of the invention for decontaminating surfaces contaminated with chemical and/or biological warfare agents are preferably employed in such a way that they are applied to the contaminated surface in a spraying method with the aid of suitable spraying apparatuses. It is also possible to apply the detoxicant solution of the invention to the contaminated surface by rollers, wipers or cloths, although care ought to be taken in this case that the persons responsible for applying the detoxicant solutions are protected by appropriate clothing and appropriate equipment.

The detoxicant solutions of the invention can be employed for decontaminating all types of surfaces, for example surfaces of items of clothing, floors, walls, appliances and vehicles. They are suitable for rapidly and effectively detoxifying all types of chemical and biological warfare agents.

It is to be regarded as a further advantage of the detoxicant solutions of the invention that they not only dissolve the thickeners frequently also used in these warfare agents, but also ensure that they very rapidly lose their adhesive properties. It is possible in this way very rapidly to destroy the exposed warfare agents, with the time for detoxification being distinctly reduced—by comparison with other decontaminating agents—as a result of the presence of Friedel-Crafts reagents because these are able inter alia greatly to speed up the elimination of halogens.

Other features which are considered as characteristic for the invention are set forth in the appended claims.

Although the invention is illustrated and described herein as embodied in improved detoxicant solution, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments and examples.

EXAMPLE 1

14 g of boron trifluoride, which can be purchased as 10% strength solution in methanol, ethanol and/or butanol, are blended with the aid of a magnetic stirrer at a temperature of 30° C. with 190 g of octamethylcyclo-tetrasiloxane and with 47 g of cyclododecane and 35 g of 2-propanol for about 60 minutes. The detoxicant solution of the invention which is subsequently obtained can be stored satisfactorily for months or more.

EXAMPLE 2

62 g of anhydrous aluminum trichloride are blended with the aid of a magnetic stirrer and reflux condenser at a temperature of 50° C. with 500 g of ethanol, 143 g of 1,3-dimethyl-2-imidazolidinone and 20 g of 1-heptanol for about 60 minutes. The detoxicant solution of the invention obtained in this way can be stored satisfactorily for months or more.

Effectiveness of the Detoxicant Solutions of the Invention for Chemical Warfare Agents:

The effectiveness of the detoxicant solutions prepared in examples 1 and 2 was tested on mustard gas (HD) and on mustard gas mixed with thickeners (THD) by the following method:

The warfare agent was placed as droplets both in unthickened and in thickened form on a CARC test strip (Chemical Agent Resistant Coating) and the detoxicant solution was applied thereto until covering was complete. After 30 minutes in the horizontal position, the substance composed of toxin and detoxicant solution was poured off and each test strip was thoroughly rinsed with a defined amount of water. The surface contamination remaining as residue, and thus the effectiveness of the decontamination, was then determined in accordance with STANAG-4360 by extracting the toxin from the CARC test strip with an organic solvent and analyzing the resulting solvent mixture by gas chromatography/flame photometry.

The detoxicant composition prepared in example 1 decomposed 95.9% HD and 95.1% THD within 30 minutes, and the detoxicant composition of example 2 decomposed 97.5% HD and 96.9% THD within 30 minutes.

I claim:

1. A detoxicant solution, comprising:
    0.1 to 50 parts by weight of at least one Friedel-Crafts reagent selected from the group consisting of boron trifluoride, boron trichloride, aluminium trichloride, iron trichloride, iron tribromide and titanium tetrachloride;
    0.5 to 80 parts by weight of one or more specific solvents selected from the group consisting of dimethyl sulfoxide, 1,3-dimethyl-2-imidazolidinone, and octamethylcyclotetrasiloxane;
    0.25 to 25 parts by weight, based on 100 parts by weight of the detoxicant solution, a saturated alicyclic hydrocarbon having 10 to 16 carbon atoms;
    1 to 80 parts by weight of an alcoholic solvent; and
    wherein the term "parts by weight" relates in each case to 100 parts by weight of the detoxicant solution in total.

2. The detoxicant solution according to claim 1, which further comprises 0.1 to 5 parts by weight, based on 100 parts by weight of the detoxicant solution, of 1H-benzotriazole.

3. The detoxicant solution according to claim 1, wherein a content of the Friedel-Crafts reagent(s) in the complete detoxicant solution amounts to from 1 to 40 parts by weight.

4. The detoxicant solution according to claim 1, wherein a content of the specific solvent(s) in the complete detoxicant solution amounts to from 5 to 75 parts by weight.

5. The detoxicant solution according to claim 1, wherein a content of the alcoholic solvent(s) (III) in the complete detoxicant solution amounts to from 5 to 75 percent by weight.

6. The detoxicant solution according to claim 2, wherein a content of the 1H-benzotriazole in the complete detoxicant solution amounts to from 0.5 to 2 parts by weight.

7. The detoxicant solution according to claim 1, wherein a content of the saturated alicyclic hydrocarbon in the complete detoxicant solution amounts to from 1 to 20 parts by weight.

8. The detoxicant solution according to claim 1, wherein the saturated alicyclic hydrocarbon is cyclododecane.

9. A method for detoxifying a surface contaminated with a chemical and/or biological warfare agent, which comprises spraying the detoxicant solution according to claim 1 onto the contaminated surface.

10. A method of preparing a detoxicant solution, which comprises:
    mixing:
        0.1 to 50 parts by weight of at least one Friedel-Crafts reagent selected from the group consisting of boron trifluoride, boron trichloride, aluminium trichloride, iron trichloride, iron tribromide and titanium tetrachloride;
        0.5 to 80 parts by weight of one or more specific solvents selected from the group consisting of dimethyl sulfoxide, 1,3-dimethyl-2-imidazolidinone, and octamethylcyclotetrasiloxane; 0.25 to 25 parts by weight, based on 100 parts by weight of the detoxicant solution, a saturated alicyclic hydrocarbon having 10 to 16 carbon atoms; and
        1 to 80 parts by weight of an alcoholic solvent;
    at a temperature between 10° C. and 50° C.;
    wherein the term "parts by weight" relates in each case to 100 parts by weight of the detoxicant solution in total.

11. The method according to claim 10, which further comprises admixing 0.1 to 5 parts by weight, based on 100 parts by weight of the detoxicant solution, of 1H-benzotriazole.

* * * * *